Sept. 5, 1939. H. O. FUCHS 2,171,927
BALANCING MACHINE
Filed Jan. 26, 1938 3 Sheets-Sheet 1

Inventor
Henry O. Fuchs
By
Blackmore, Spencer & Flint
Attorneys

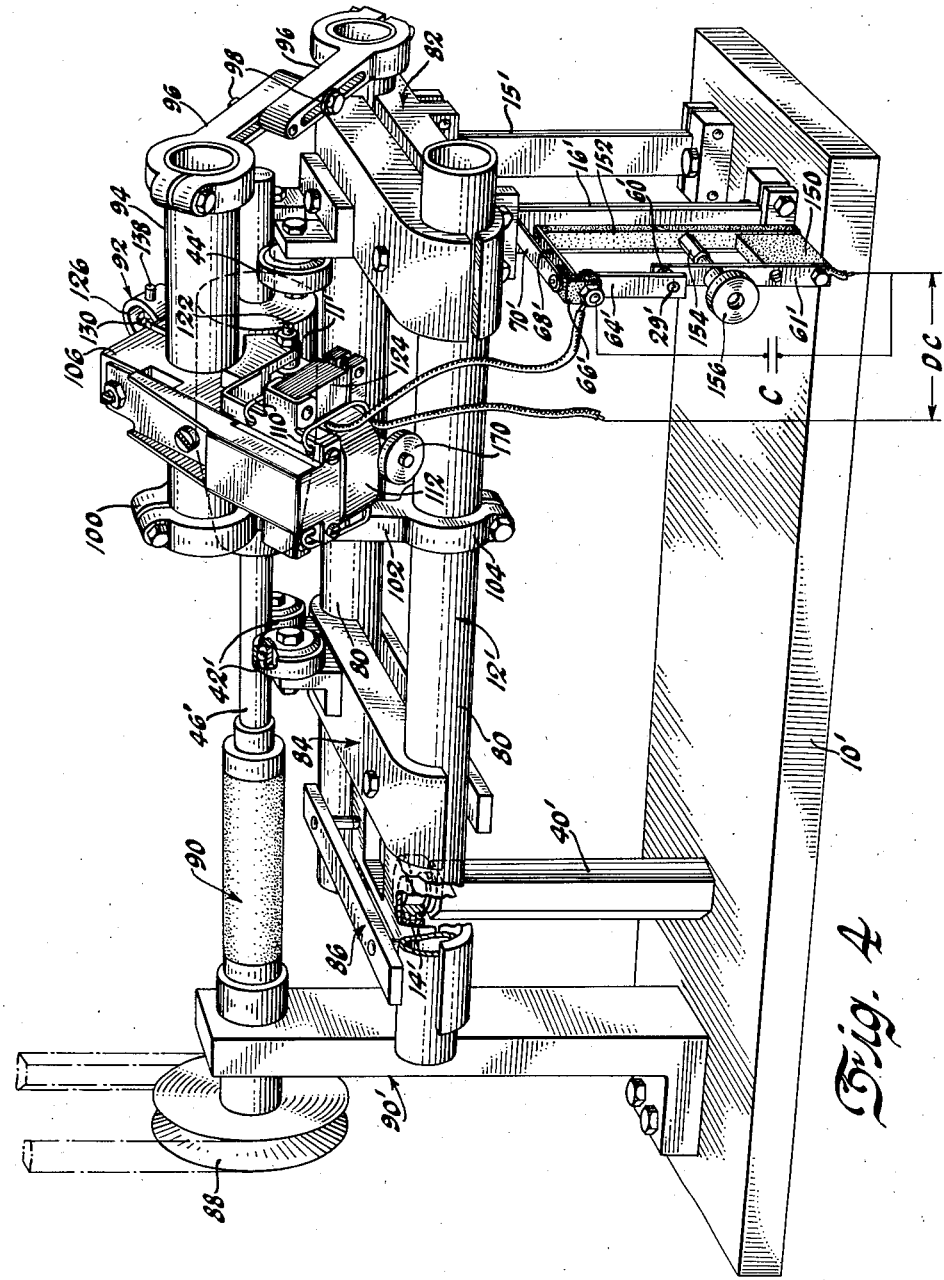

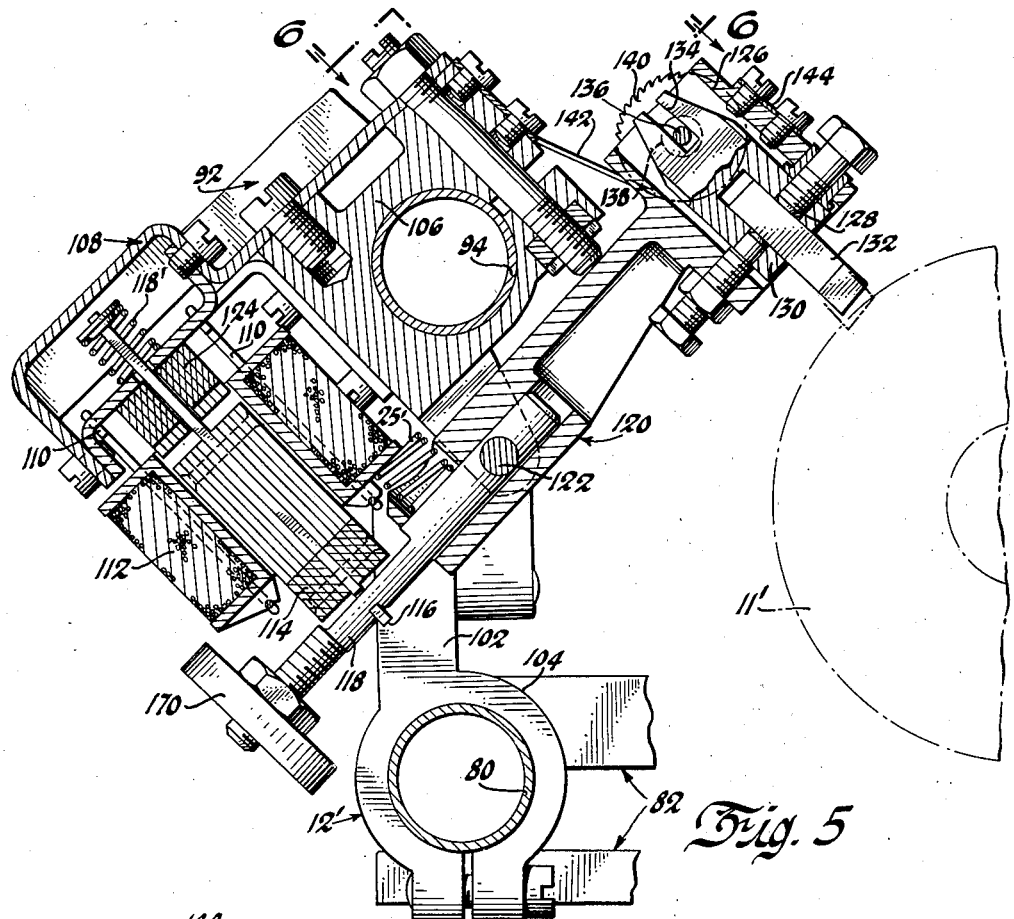

Patented Sept. 5, 1939

2,171,927

UNITED STATES PATENT OFFICE 2,171,927

BALANCING MACHINE

Henry O. Fuchs, Detroit, Mich., assignor to General Motors Corporation, Detroit, Mich., a corporation of Delaware Application January 26, 1938, Serial No. 186,969
In Germany February 5, 1937

6 Claims. (Cl. 29—27)

This invention has to do with machines for balancing rotating parts.

The object of the invention is to provide a machine which will automatically put the part in balance preferably by removing enough material in the ascertained location of unbalance to accomplish that result. This is preferably accomplished by rotating the part to be balanced whereupon the part, if it is out-of-balance, performs a gyratory movement. In conventional balance indicating machines this gyratory movement is used either directly or indirectly to reciprocate an indicator to give the amount of unbalance. The angular location of unbalance is given by noting the angular position of the body at the time of maximum indication of unbalance by means of suitable angle indicating mechanism driven from the rotating body. This reading must be corrected for the error resulting from the observed fact that the angular position of the shaft when the reading of unbalance is a maximum depends upon the speed of rotation in its relation to the critical speed of the body being tested.

According to my invention the gyratory movement of the part resulting from unbalance is used to correct the shaft for unbalance preferably by moving a tool into cutting engagement with the heavy side of the rotating shaft for a period of time depending upon the amount of unbalance. The body is driven at a predetermined speed and the cutting tool is initially so located angularly with respect to the means for energizing the tool advancing means as to engage the body at the proper location to correct for unbalance. The tool advancing mechanism is so arranged that it is automatically shifted along the axis of the shaft and each successive cut becomes automatically of shorter length as balance is approached for the eccentricity of movement of the shaft decreases with each correction for unbalance. When balance is reached the tool is no longer advanced toward the work and the body is ready to be removed from the machine.

The accompanying drawings and specification illustrate one embodiment of the invention. Obviously it may take many forms.

In the drawings:

Figure 4 is a perspective view of a modified form of balancing machine similar to that shown in Figure 1, but disclosing more of the details of construction.

Figure 5 is a vertical section through the tool feeding mechanism shown at the right of Figure 4.

Figure 6 is a view taken on line 6—6 of Figure 5.

Figure 1:
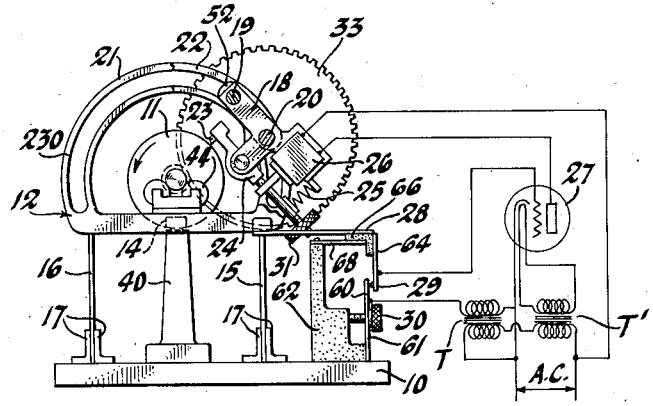
Figure 1 is an end elevation of an embodiment of my invention shown somewhat diagrammatically.
Figure 2:
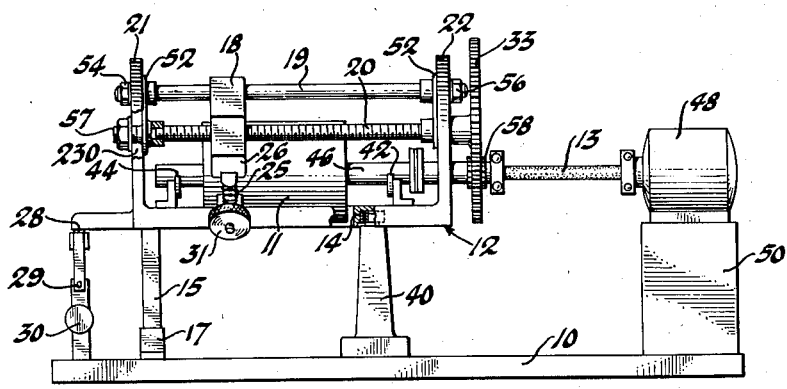
Figure 2 is a side elevation of the balancing machine shown in Figure 1.

Referring first to Figures 1 and 2, 10 indicates the base of the machine on which is secured the pedestal 40 carrying at its upper end the universal bearing 14, preferably of the ball bearing type, shown in detail at 14' in Figure 4. At one end of the base 10 are upright spring blade supports 15 and 16 secured to the base by means of angle iron 17. Cradle 12 is mounted at one end on the bearing 14 and at the other end is supported by the spring blades 15 and 16. With this arrangement the end of the cradle connected to the spring supports is free to move from one side to the other, oscillating on bearing 14 as a pivot. On the cradle 12 are mounted pairs of rollers 42 and 44 adapted to support shaft 46 carrying the part 11 to be balanced, this part being shown in Figure 3 as a cylindrical element, although obviously the machine is capable of balancing any rotating part. Shaft 46 is connected in any suitable manner, preferably by means of a universal joint, with a flexible drive shaft 13 of electric motor 48 mounted on a suitable pedestal 50 on the base 10.

Projecting upwardly from opposite ends of the cradle 12 are arcuate supports 21 and 22, each slotted as shown at 230 to receive the ends of guide 19 and feed screw 20, the ends of which are held in spaced relation by means of brackets 52. The guide 19 and feed screw 20 are held in the slots 230 by means of nuts 54 and 56 engaging the ends of the guide 19 and the end of a suitable stud 57 connected to one of the brackets 52. The feed screw 20 is, of course, mounted in suitable bearings carried by the brackets 52 and to one end of the feed screw is secured a driven gear 33 meshing with drive gear 58 shown as mounted on the drive 13 of motor 48.

On the guide 19 is slidably mounted bracket 18 which is also in threaded engagement with the feed screw 20. To the bracket 18 is pivoted the tool holder 24 carrying cutting tool 23 at one end and counterbalance weight 31 at the other end. Between the last-named end of the tool carrier and the bracket 18 is arranged the compression spring 25 which normally urges the tool 23 away from the part to be balanced. 26 indicates an electromagnet having a movable armature connected to the tool carrier 24. When the magnet is energized it swings the tool holder 24 in a direction to cause the tool 23 to engage the part to be balanced, compressing the spring 25.

The circuit controlling magnet 26 is actuated by the closing of contacts 29 and 60 as a result of vibration of the end of the cradle supported by the springs 15 and 16. Contact 60 is carried by the end of vertical leaf spring 61 having its lower end secured to a suitable pedestal 62 mounted on the base 10. An intermediate part of this leaf spring is secured to the pedestal by means of adjusting screw 30 so as to permit adjustment of the action of the contacts. Contact 29 is carried by leaf spring 64 secured to a suitable insulating member 66 mounted on the end of horizontal leaf spring 68 secured to the top of pedestal 62. There is secured to the insulating member 66, out of contact with the leaf spring 64, horizontal spring 28 which is bolted to one end of the cradle 12. Contacts 29–60 are arranged in the grid circuit of a three element gas-filled tube 27, preferably of the Thyratron type. The grid circuit is supplied with energy from transformer T, which is fed from a suitable alternating current supply circuit. The filament is shown as consisting of an indirectly heated emitter, the heater being supplied with energy from transformer T' supplied from the same A. C. circuit. The electromagnet 26 is arranged in the plate circuit of the tube as shown.

The machine operates as follows: With the tool holding mechanism at the left end of the feed screw 20, as viewed in Figure 2, the body 11 to be balanced is brought up to the desired speed by means of motor 48. If the body is out-of-balance it causes the cradle 12 to oscillate about the bearing 14 as a center, flexing the spring supports 15 and 16 from one side to the other. As a consequence the spring 28 also moves from one side to the other and, when moving to the right, as viewed in Figure 1, causes the spring 68 to flex downwardly and spring 64 to move in clockwise direction bringing the contact 29 into engagement with the contact 60, thereby closing the grid circuit of the tube 27 and causing current to flow through the electromagnet 26, which thereupon pulls up its armature 24, bringing the tool 23 down into engagement with the body 11. This takes place while the heavy side of the body 11 faces the tool. This result is obtained by initial adjustment of the tool holding mechanism to the proper angular position about the axis of the body 11, this adjustment being accomplished by loosening the nuts 54 and 56 and swinging the tool holding mechanism around the axis of the shaft, guided in the slots 230 and thereafter locking it in place. As the heavy side moves away from under the tool cradle 12 is swung to the left, as viewed in Figure 1, by the effect of the remaining unbalance, separating the contacts 29—60 and deenergizing the magnet 26, whereupon the spring 25 withdraws the tool 23 from engagement with the body 11.

During this operation the tool holder is shifted to the right by the action of feed screw 20 making an interrupted helical cut in the body and on the next cycle of operations, if the body 11 is still out-of-balance, a second spiral cut is made, but since the unbalance has been partially removed the period during which contacts 29 and 60 will remain closed will be shorter and the cut will be of shorter length. This action is repeated until the part is in balance, and when this stage is attained there will be no movement of the cradle, and the contacts 29 and 60 will remain out of engagement. The machine is then stopped and the balanced body may be removed and another inserted.

Figure 3:
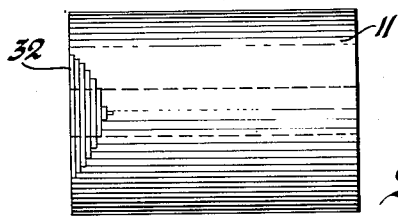
Figure 3 is a side elevation of a cylindrical part after being balanced on the machine showing diagrammatically, and in an exaggerated way, the location of the places on the body from which material was removed to balance it.

In Figure 3 there is shown diagrammatically a balanced body with the cuts made in balancing indicated at 32.

In Figures 4 to 6 there is shown a slightly different embodiment of the invention illustrating somewhat more clearly some of the details of construction. In these figures 10' indicates the base, 40' the pedestal carrying at its upper end the universal ball bearing 14'. 15' and 16' indicate the vertical spring supports for the cradle 12' consisting of tubes 80 held together by suitable clamps 82, 84 and 86. To the upper members of the clamps 82 and 84 are secured the rollers 42' and 44' carrying the shaft 46' on which is mounted the body to be balanced 11'. For convenience in assembly the upper ends of the spring supports 15' and 16' are shown secured to the lower member of clamp 82 and the universal bearing 14' is mounted in the lower member of clamp 86.

Shaft 46' carrying the body 11' to be balanced is illustrated as driven from pulley 88 or other driving member by means of universal coupling 90 illustrated as a rubber hose. The bearing for the pulley shaft is supported by a suitable pedestal 90' mounted on the base 10'. The tool feeding mechanism indicated diagrammatically at 92 is mounted on tubular support 94, one end of which is mounted on one of the tubes 80 of the cradle 12' by means of clamps 96 which may be angularly adjusted about the axes of the tubes by loosening the split clamping collars by which they are secured to them. The members 96 are adjustably secured to each other by means of threaded studs 98, each of which is adjustable in a slot formed in one of the members 96, and passes through an aperture formed in the other. The opposite end of tubular support 94 is adjustably mounted in split clamping collar 100 formed on bracket 102 having a split clamping collar 104 at its lower end encircling the other tubular member 80 of cradle 12'.

The tool feeding mechanism 92 comprises a support 106 in the form of a split collar clamped about the tube 94. To the collar 106 is secured a hollow stamped bracket 108 from which is suitably supported as by means of stirrups 110 the electromagnet 112 having a movable core 114 riveted to member 116 which in turn is hooked about or otherwise secured to stud 118 extending from the tool holder 120 pivoted at 122 to an extension on the support 106. The member 116 is urged upwardly by means of coil spring 118' reacting against a portion of the hollow bracket 108 and a collar secured to the upper end of the member 116. A spring 25', stronger than spring 118', normally urges tool holder 120 in counterclockwise direction to move the cutting tool 132 away from the part to be balanced. The effect of the two springs 25' and 118' is to maintain member 116 at all times in engagement with member 118. The external magnetic circuit of the magnet 112 is shown in Figure 4 as completed by laminated soft iron core members 124. In the passage 126 in one end of the tool holder 120 is pivoted at 128 a carrier 130 in which is held the cutting tool 132. The upper end of the carrier 130 is slotted at 134 to receive the reduced portion 136 of shaft 138 in threaded engagement with aperture 139 in the holder 120. At one end of the shaft 138 is secured the ratchet wheel 140 engaged by leaf spring dog 142 clamped to the support 106. Detent 144 mounted on the tool holder 120 engages the other side of the ratchet wheel 140. On stud 118 extending from tool holder 120 is mounted the adjustable counterweight 170.

There is shown in Figure 4 a simple circuit supplying direct current to the contacts 29' and 60' in series with the electromagnet 112. A condenser C is shown connected across the contacts to reduce arcing.

If preferred, the alternating current circuit shown in Figure 1 may be used instead.

The details of the automatic control switch are shown in Figure 4, and these, in general, are substantially the same as shown in Figure 1. 60' indicates the lower contact carried by a vertically arranged leaf spring contact member 61' mounted on insulating block 150 secured to the base 10'. Extending upwardly from block 150 is insulating support 152 carrying threaded stud 154 passing through an aperture in the spring contact member 61'. 156 indicates a thumb nut threaded on the outer end of stud 154 to permit adjustment of the engagement of the contacts. Contact 29' is carried by spring contact member 64' supported by an angle shaped piece of insulation 66' supported by horizontal leaf spring member 68' secured to the upper end of insulating member 152. To the insulating member 66' is secured horizontal leaf spring 70' secured to the cradle 12'. This circuit controlling mechanism is substantially the same as that shown in Figure 1 and operates in the same manner.

Obviously when the contacts 29'—60' are engaged magnet 112 is energized, moving the tool 132 into engagement with the part to be balanced. When the cradle swings in the other direction the contacts separate, breaking the circuit, and the magnet 112 is deenergized, causing spring 25' to retract the tool 132 from the part to be balanced whereupon the engagement of the ratchet wheel 140 with the dog 142 rotates the ratchet wheel one step, causing the shaft 138 to move longitudinally rocking the tool holder 130 on the pivot 128 so that on the next revolution the tool 132 engages another portion of the periphery of the shaft. The pivotal movement of the tool also results in variation in the depth of the cuts. Except for this different traversing mechanism for the tool this form of the invention operates in substantially the same way as the previous form. It will, therefore, not need to be described in detail.

It will be appreciated that the adjustable supports for the tool holder in the second form of the invention permit a considerable angular adjustment of the tool holder around the axis of the part to be balanced. This adjustment corresponds to that provided by the slots 230 in Figures 1 and 2. The purpose of this adjustment is to enable the tool holder to be set so that the tool engages the work while the heavy side of the shaft is presented to it. This angular relation varies with the speed at which the part is rotated, and hence adjustment must be provided.

It will be obvious that my invention is capable of considerable modification. Thus while a conventional cutting tool is shown at 23 and at 132, it is obvious that other cutting or abrading instruments may be employed, and the term "cutting tool" is used in this specification to cover broadly any sort of instrument for removing material from the body to be balanced.

Attention is called to the importance of providing the counterweight shown at 31 in Figures 1 and 2 and at 170 in Figures 4 and 5. The object of the counterweight is to balance the effect on the cradle of the swinging of the tool toward or from the body to be balanced. If this were not done the movement of the cradle would not be a true indication of unbalance.

It is also important that the speed of revolution of the body to be balanced be different from the natural frequency of the cradle and body to avoid too great sensitivity of the phase angle.

The adjustment provided by members 30 and 156 permits fixing of the amount of vibration which is just sufficient to bring the tool into action. This determines the sensitivity of the machine.

Obviously the motion performed by the part 11 or 11' is not pure gyratory movement in that the part is restrained from movement except in the path determined by the spring supports 15, 16 or 15', 16'. However the movement permitted by these supports is, in effect, a cross-section through pure gyratory movement and the phrase "gyratory movement" is used in this specification to cover such movement as well as more conventional gyratory movement.

I claim:

1. In a balancing machine, means for supporting the part to be balanced so as to permit it to perform a gyratory movement, means for rotating the part, means for correcting the part for unbalance, and means actuated by the gyratory movement of the part for causing the unbalance correcting means to operate to put the part in balance during its rotation.

2. In a balancing machine, means for supporting the part to be balanced so as to permit it to perform a gyratory movement, means for rotating the part, means for removing material from the part, said means being shiftable to and from operative engagement with the part, and means actuated by the gyratory movement of the part for shifting the material removing means into operative engagement with the heavy side of the part to put the part in balance during its rotation.

3. In a balancing machine, means for supporting the part to be balanced so as to permit it to perform a gyratory movement, means for rotating the part, a cutting tool, said tool being shiftable to and from operative engagement with the rotating part, and means actuated by the gyratory movement of the part during rotation for shifting the tool into operative engagement with the heavy side of the part to remove material to put the part in balance during its rotation.

4. In a balancing machine the combination of a support, a frame mounted on the support for gyratory movement, means on the frame for rotatably supporting a part to be balanced, means for rotating said part when so supported, means carried by said frame for correcting the part for unbalance, and means actuated by the gyratory movement of the frame produced by rotation of the unbalanced part therein for causing the unbalance correcting means to operate to put the part in balance during its rotation.

5. In a balancing machine the combination of a support, a frame mounted on the support for gyratory movement, means on the frame for rotatably supporting a part to be balanced, means for rotating said part when so supported, means carried by said frame for removing material from the part, said means being shiftable to and from operative engagement with the part, and means actuated by gyratory movement of the frame produced by rotation of the unbalanced body therein for shifting the material removing means into operative engagement with the heavy side of the part to put the part in balance during its rotation.

6. In the combination as defined in claim 5, means for counterbalancing said material removing means so that the balance of the frame and part carried thereby is not affected by movement of said material removing means in response to unbalance.

HENRY O. FUCHS.